US011758581B2

(12) United States Patent
Tang

(10) Patent No.: US 11,758,581 B2
(45) Date of Patent: Sep. 12, 2023

(54) CLEAR CHANNEL LISTENING METHOD AND APPARATUS, AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/039,010

(22) Filed: Sep. 30, 2020

(65) Prior Publication Data

US 2021/0014896 A1   Jan. 14, 2021

Related U.S. Application Data

(63) Continuation of application No. PCT/CN2018/081737, filed on Apr. 3, 2018.

(51) Int. Cl.
*H04W 74/08* (2009.01)
*H04B 7/06* (2006.01)
(Continued)

(52) U.S. Cl.
CPC ...... *H04W 74/0808* (2013.01); *H04B 7/0626* (2013.01); *H04L 5/0051* (2013.01);
(Continued)

(58) Field of Classification Search
CPC ............. H04W 74/0808; H04W 16/14; H04W 56/001; H04W 72/0446; H04L 5/0051; H04L 5/10
See application file for complete search history.

(56) References Cited

U.S. PATENT DOCUMENTS

2019/0037509 A1* 1/2019 Li .................. H04W 56/001
2020/0022185 A1* 1/2020 Luo ................ H04W 56/0015
(Continued)

FOREIGN PATENT DOCUMENTS

CN    107637156 A    1/2018
WO    2015020108 A1  2/2015

OTHER PUBLICATIONS

MediaTek Inc. 3GPP TSG RAN WG1 Meeting #92 R1-1801656; Considerations on NR Unlicensed Channel Access, Athens, Greece, Feb. 26-Mar. 2, 2018.
(Continued)

*Primary Examiner* — Chae S Lee
(74) *Attorney, Agent, or Firm* — Ladas & Parry LLP

(57) ABSTRACT

The present disclosure relates to the technical field of communications, and provides a clear channel listening method and apparatus and a device. The method comprises: determining a signal block set, the signal block set comprising n signal blocks; each signal block comprising at least one signal and/or at least one channel; n being an integer greater than 1; executing one clear channel assessment (CCA) on a channel of an unlicensed spectrum before transmitting the signal blocks comprised in the signal block set; and if the CCA result is that the channel of the unlicensed spectrum is available, using the channel of the unlicensed spectrum to transmit the signal blocks comprised in the signal block set. The present disclosure provides a solution for using an unlicensed spectrum to transmit signal blocks in an NR system, which may meet the CCA detection time by the intervals among the signal blocks.

23 Claims, 4 Drawing Sheets

(51) Int. Cl.
*H04L 5/00* (2006.01)
*H04L 5/10* (2006.01)
*H04W 16/14* (2009.01)
*H04W 56/00* (2009.01)
*H04W 72/0446* (2023.01)

(52) U.S. Cl.
CPC ............... *H04L 5/10* (2013.01); *H04W 16/14* (2013.01); *H04W 56/001* (2013.01); *H04W 72/0446* (2013.01)

(56) References Cited

U.S. PATENT DOCUMENTS

| | | | | |
|---|---|---|---|---|
| 2020/0163037 | A1* | 5/2020 | Zheng | H04L 5/0078 |
| 2020/0245274 | A1* | 7/2020 | Huang | H04W 48/10 |
| 2021/0022095 | A1* | 1/2021 | Jiang | H04W 72/0446 |

OTHER PUBLICATIONS

Qualcomm Incorporated, 3GPP TSG RAN WG1 Meeting #92 R1-1802865; Potential solutions and techniques for NR unlicensed, Athens, Greece, Feb. 26-Mar. 2, 2018.

The EESR of corresponding European application No. 18913379.6, dated Feb. 1, 2021.

Nokia et al:"Potential solutions and techniques for NR unlicensed", 3GPP Draft; R1-1802526_NR-U Solutions, 3rd Generation Partnership Project (3GPP), Mobile Competence Centre; 650, Route Des Lucioles; F-06921 Sophia-Antipouis Cedex, France, vol. RAN WG1, No. Athens, Greece; Feb. 26, 2018-Mar. 2, 2018 Feb. 16, 2018(Feb. 16, 2018), XP051397470.

International Search Report(ISR) dated Dec. 18, 2018 for Application No. PCT/CN2018/081737.

Inter Digital Inc. 'Considerations on Synchronization Signal for NR Unlicensed Spectrum' 3GPP TSG RAN WG1 Meeting 92 R1-1802647, Feb. 17, 2018(Feb. 17, 2018), sections 2 and 3.

The first Office Action of corresponding Indian application No. 202017047867, dated Dec. 8, 2021.

The first Office Action of corresponding Japanese appiieation No. 2020-553573, dated Dec. 14, 2021.

Ericsson, SS Burst Set Composition[online], 3GPP TSG-RAN WG1 Meeting #88bis RI-1706008, Internet<URL: http://www.3gpp.org/ftp/tsg_ran/WG1_RL1/TSGR1_88b/Docs/R1-1706008.zip>, Mar. 25, 2017.

The first Office Action of corresponding European application No. 18913379.6, dated Mar. 13, 2023.

InterDigital Inc. Proposals for NR Operation in Unlicensed Spectrum, R1-1802645, 3GPP TSG RAN WG1 Meeting 92, Athens, Greece, Feb. 26-Mar. 2, 2018.

* cited by examiner

CLEAR CHANNEL LISTENING METHOD AND APPARATUS, AND DEVICE

CROSS-REFERENCE TO RELATED APPLICATION

This application is a continuation of International Application No. PCT/CN2018/081737, filed on Apr. 3, 2018, which is hereby incorporated by reference in its entirety.

TECHNICAL FIELD

Embodiments of the present disclosure relate to the field of communication technologies and, in particular, to a clear channel listening method, apparatus and device.

BACKGROUND

In a New Radio (NR) system, devices are allowed to use an unlicensed spectrum for signal transmission.

Before using the unlicensed spectrum for signal transmission, the device must follow a listen-before-talk (LBT) principle, that is, the device needs to execute a Clear Channel Assessment (CCA) to determine whether a channel of the unlicensed spectrum is available, and when it is determined to be available, transmit signals through the channel of the unlicensed spectrum.

SUMMARY

Embodiments of the present disclosure provide a clear channel listening method and apparatus, and device.

On the one hand, an embodiment of the present disclosure provides a clear channel listening method. The method includes:

determining a signal block set, the signal block set including n signal blocks, each signal block including at least one signal and/or at least one channel, n being an integer greater than 1;

executing one CCA on a channel of an unlicensed spectrum before transmitting the signal blocks included in the signal block set; and if the result of the CCA is that the channel of the unlicensed spectrum is available, using the channel of the unlicensed spectrum to transmit the signal blocks included in the signal block set.

On the other hand, an embodiment of the present disclosure provides a clear channel listening apparatus. The apparatus includes:

a set determination module, configured to determine a signal block set, the signal block set including n signal blocks, each signal block including at least one signal and/or at least one channel, n being an integer greater than 1;

a channel listening module, configured to execute one CCA on a channel of an unlicensed spectrum before transmitting the signal blocks included in the signal block set;

a signal transmission module, configured to use the channel of the unlicensed spectrum to transmit the signal blocks included in the signal block set if the result of the CCA is that the channel of the unlicensed spectrum is available.

In still another aspect, an embodiment of the present disclosure provides an access network device, the access network device including a processor and a memory, the memory storing at least one instruction, and the at least one instruction is used to be executed by the processor to implement the method described in the aspect.

In yet another aspect, an embodiment of the present disclosure provides a computer-readable storage medium, the computer-readable storage medium, storing at least one instruction, and the at least one instruction is used to be executed by the processor to implement the method described in the aspect.

Embodiments of the present disclosure provide a solution for using the unlicensed spectrum to transmit signal blocks in an NR system, which solves the problem of inability to meet the CCA detection time by the intervals among the signal blocks, makes it convenient for an access network device to make an appropriate directional LBT during signal block transmission, and improves the transmission success rate.

DESCRIPTION OF EMBODIMENTS

To make the objectives, technical solutions and advantages of the present disclosure clearer, the following describes the embodiments of the present disclosure in further detail with reference to the accompanying drawings.

The "module" mentioned herein usually refers to a program or instruction stored in a memory capable of realizing certain functions; the "unit" mentioned herein usually refers to a functional structure which is logically divided, and the "unit" can be realized by pure hardware, or a combination of hardware and software.

The "plurality" mentioned herein refers to two or more. "And/or" describes the relationship of related objects, indicating that there can be three relationships, for example, A and/or B, which may indicate: three conditions of that, A exists alone, A and B both exist at the same time, and B exists alone. The character "/" generally indicates that the related object is a relationship of "or". The terms "first", "second" and similar words used in the specification and claims of the present disclosure do not indicate any order, quantity or importance, but are only used to distinguish different components.

Figure 1:
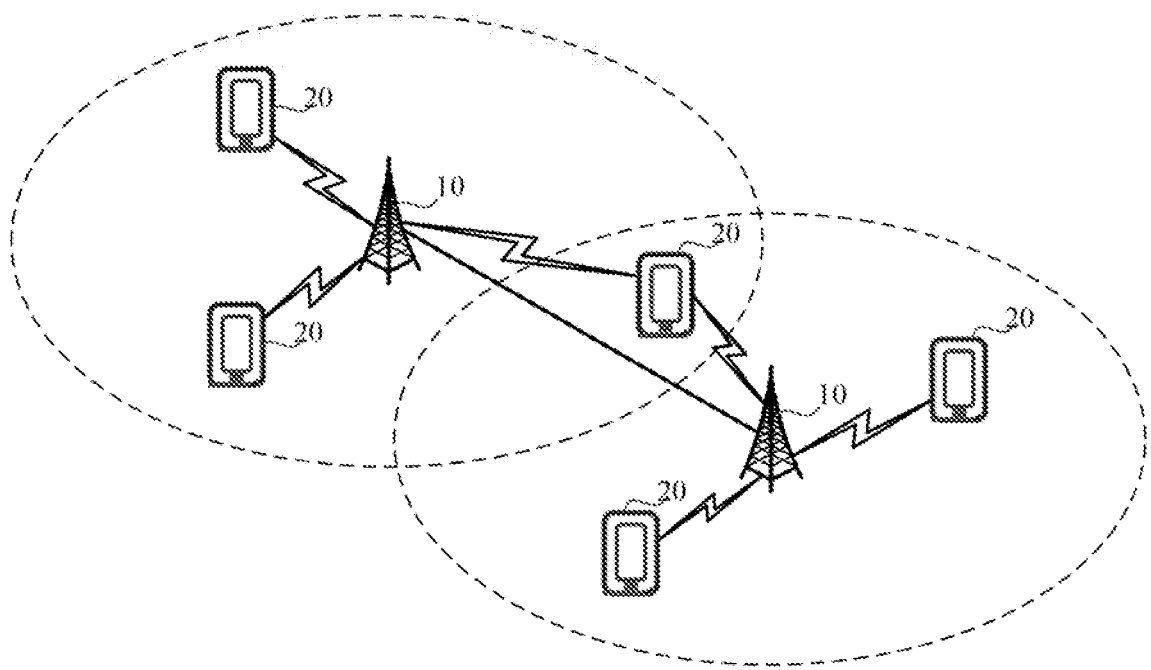
FIG. 1 is a schematic structural diagram of a mobile communication system provided by an embodiment of the present disclosure.

Please refer to FIG. 1, which illustrates a schematic structural diagram of a mobile communication system provided by an embodiment of the present disclosure. The mobile communication system may include: an access network device 10 and a terminal 20.

The access network device 10 is deployed in the wireless access network to provide the terminal 20 with a wireless access function. The access network device may be a Base Station (BS). The access network device 10 may wirelessly communicate with the terminal 20 via one or more antennas. The access network device 10 may provide communication coverage for its geographical area. The base stations may include macro base stations, micro base stations, relay stations, access points, and other different types. In some embodiments, a base station may be called a base station transceiver, a wireless base station, an access point, a wireless transceiver, a Basic Service Set (BSS), an Extended Service Set (ESS), a Node B (NodeB), an evolved Node B (evolved NodeB, eNB or eNodeB) or some other appropriate terminology by persons skilled in the art. Exemplarily, in a 5G system, the base station is called gNB. For convenience of description, in the embodiments of the present disclosure, the devices that provide a wireless communication function for the terminal 20 are collectively referred to as access network devices.

The terminal 20 may be distributed throughout the mobile communication system, and each terminal 20 may be stationary or mobile. The terminal 20 may also be called a mobile station, a user station, a mobile unit, a user unit, a wireless unit, a remote unit, a mobile device, a user device, a wireless device, a wireless communication device, a remote device, a mobile user station, an access terminal, a mobile terminal, a wireless terminal, a remote terminal, a handheld device, a user agent, a mobile client, a client or some other appropriate terminology by persons skilled in the art. The terminal 20 may be a cellular phone, a Personal Digital Assistant (PDA), a wireless modem, a wireless communication device, a handheld device, a tablet computer, a laptop computer, a cordless phone, a Wireless Local Loop (WLL) station etc. The terminal 20 can communicate with the access network device 10 in the mobile communication system.

The access network device 10 and the terminal 20 may communicate with each other through radio technology, for example, through cellular technology. A communication link between the access network device 10 and the terminal 20 may include: a down link (DL) transmission from the access network device 10 to the terminal 20, and/or an up link (UP) transmission from the terminal 20 to the access network device 10. Down link transmission may also be referred to as forward link transmission, and up link transmission may also be referred to as reverse link transmission. In some examples, the down link transmission may include transmission of a discovery signal, the discovery signal may include a reference signal and/or a synchronization signal.

In some examples, the communication link may include one or more carriers, where each carrier may be a signal composed of multiple subcarriers modulated according to various wireless technologies (e.g., waveform signals at different frequencies). Each modulated signal may be transmitted on different subcarriers and may carry control information (e.g., reference signals, control channels, etc.), overhead information, user data, and the like.

The mobile communication system shown in FIG. 1 may be a Long Term Evolution (LTE) system, or a next-generation evolution system based on the LTE system, such as an LTE-A (LTE-Advanced) system or a 5th generation (5G) system (also known as NR system), or a next generation evolution system based on the 5G system, etc. In the embodiments of the present disclosure, the terms "system" and "network" are often used interchangeably, but persons skilled in the art can understand their meaning.

In the conventional LTE system, data transmission is conducted between the access network device 10 and the terminal 20 through a licensed spectrum. With the increase of business volume, especially in some urban areas, the licensed spectrum may be difficult to meet the demand of business volume. By introducing a Licensed-assisted Access (LAA) technology, data transmission between the access network device 10 and the terminal 20 can be realized through an unlicensed spectrum, which can meet the needs of greater business volume.

Unlicensed spectrum is a spectrum allocated by countries and regions for radio device communication. The spectrum is generally regarded as a shared spectrum, that is, communication devices in different communication systems can use the spectrum as long as they meet the regulatory requirements on the spectrum set by countries or regions, without applying to the government for an exclusive spectrum license. The unlicensed spectrum may also be referred to as a non-licensed spectrum, a shared spectrum, a non-licensed frequency band, an unlicensed frequency band, a shared frequency band, an unauthorized spectrum, an unauthorized frequency band, or some other appropriate terminology by persons skilled in the art.

NR unlicensed technology is being discussed under the Third Generation Partnership Project (3GPP), so as to use NR technology for communication on the unlicensed spectrum. In NR systems, due to the use of higher frequency bands, signals are mostly transmitted by directional beams. Due to the directivity of signal transmission, when doing channel listening (such as CCA), an ideal way is to also use a directional channel listening, that is, directional LBT. When channel listening is executed through the directional LBT and a channel is found to be clear, the directional beam can be used to transmit signals to occupy the channel. Compared with omni-directional LBT, the directional LBT can increase access opportunities, because channel occupation in different beam directions can be carried out simultaneously through space division multiplexing.

For NR unlicensed technology, it also needs to transmit a Synchronization Signal Block (SSB). It may be used for synchronization and measurement of the terminal 20 in a non-standalone mode, and may also be used for initial access of the terminal 20 in a standalone mode. Since different SSBs may correspond to the same or different beams, before transmitting the SSB, the access network device 10 needs to execute directional LBT for channel listening. The SSB can be called as SS/PBCH Block.

In time domain, one SSB occupies 4 symbols (i.e., Orthogonal Frequency Division Multiplexing (OFDM) symbols), including: one symbol of a Primary Synchronization Signal (PSS), one symbol of a Secondary Synchronization Signal (SSS) and two symbols of a Physical Broadcast Channel (PBCH). Within the SSB, the symbols are numbered from 0 to 3 in ascending order. In frequency domain, one SSB occupies 24 consecutive Resource Blocks (RB). Each RB includes 12 subcarriers, and the subcarriers in the 24 RBs are numbered from 0 to 287 in ascending order, starting with the lowest numbered RB. For the PSS and SSS, resources are mapped to the 127th subcarrier in the middle; for the PBCH, resources are mapped to the 288th subcarrier. PSS, SSS, and the PBCH have the same Cyclic Prefix (CP) length and subcarrier interval. The subcarrier interval can be configured as 15 kHz, 30 kHz, 120 kHz and 240 kHz. To support beam scanning, the SSB is organized into a series of bursts and transmitted periodically.

Figure 2:
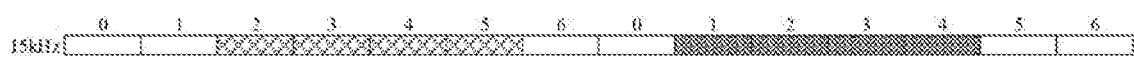
FIG. 2 is a schematic diagram exemplarily illustrating a distribution of Synchronization Signal Block (SSB) in time domain at 15 kHz subcarrier interval.

Please refer to FIG. 2, which is a schematic diagram exemplarily illustrating a distribution of SSB in time domain at 15 kHz subcarrier interval. One SSB occupies 4 consecutive symbols, and there is a transmission time interval of 2 symbols between two adjacent SSBs.

Figure 3A:
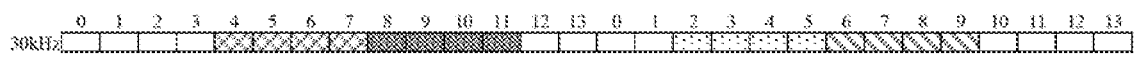
FIGS. 3A and 3B are schematic diagrams exemplarily illustrating distributions of SSB in time domain at 30 kHz subcarrier interval.
Figure 3B:
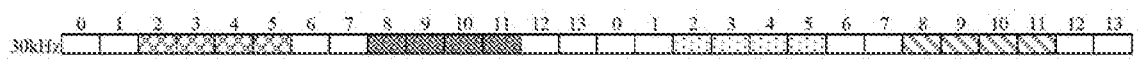

Please refer to FIGS. 3A and 3B, which are schematic diagrams illustrating distributions of SSB in time domain at 30 kHz subcarrier interval. In a first mode, as shown in FIG. 3A, one SSB occupies four consecutive symbols, and there is no transmission time interval between two adjacent SSBs. In a second mode, as shown in FIG. 3B, one SSB occupies 4 consecutive symbols, and there is a transmission time interval of two symbols between two adjacent SSBs.

Figure 4:
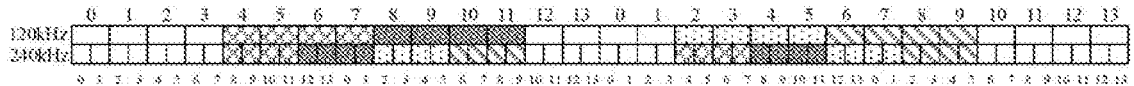
FIG. 4 is a schematic diagram exemplarily illustrating a distribution of SSB in time domain at 120 kHz and 240 kHz subcarrier interval.

Please refer to FIG. 4, which is a schematic diagram illustrating a distribution of SSB in time domain at 120 kHz and 240 kHz subcarrier interval. One SSB occupies 4 consecutive symbols, and there is no transmission time interval between two adjacent SSBs.

As can be seen from the FIGS. 2 to 4, when using the unlicensed spectrum to transmit SSB, according to current designs for SSB transmission modes, some SSBs have no transmission time interval in the time domain, or the transmission time interval is very short, and execution of CCA takes a certain amount of time, at least 25 us, so the CCA cannot be executed before transmitting some SSBs. It can be seen from this that there is currently no suitable solution for using the unlicensed spectrum to transmit SSB or other signal blocks with similar characteristics to SSB in NR system.

Figure 5:
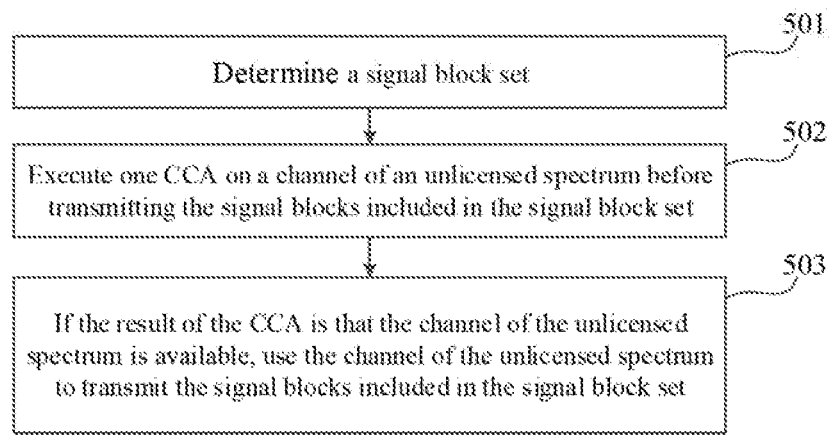
FIG. 5 is a flowchart of a clear channel listening method provided by an embodiment of the present disclosure.

Please refer to FIG. 5, which illustrates a flowchart of a method for clear channel listening provided by an embodiment of the present disclosure. The method may be applied to the access network device 10 of the mobile communication system shown in FIG. 1. The method may include the following steps:

Step 501: Determine a signal block set.

In the embodiment of the present disclosure, a signal block set is defined. The signal block set includes n signal blocks, and n is an integer greater than 1, that is, the signal block set includes two or more signal blocks. Each signal block includes at least one signal and/or at least one channel.

In one example, the signal block is the SSB. The access network device 10 may determine a SSB set, and the SSB set includes two or more SSBs.

In another example, each signal block includes: at least one signal and/or at least one channel associated with one SSB.

In yet another example, each signal block includes: one SSB, and at least one signal and/or at least one channel associated with the one SSB.

The at least one signal includes at least one of the following signals: a Channel state information-reference signal (CSI-RS), a Phase-tracking reference signal (PTRS), and a Demodulation reference signal (DMRS).

The at least one channel includes at least one of the following channels: a channel carrying Remaining Minimum System Information (RMSI), a Physical Downlink Control Channel (PDCCH) associated with RMSI, a channel carrying paging information, a PDCCH associated with paging information, a channel carrying other system information (OSI), and a PDCCH associated with OSI.

A division of the signal block set may be pre-defined (such as pre-specified by standards or protocols), or may be customized by the access network device 10, for example, configured by an upper layer of the access network device 10, and then notified to a lower layer.

In a possible implementation, two adjacent signal blocks between which a time interval is less than execution time duration of the CCA are divided into a same signal block set. The execution time duration of the CCA refers to the time required to execute a complete CCA process. The execution time may be determined according to an actual situation, for example, according to a priority of the executed CCA.

Exemplarily, taking the signal block as the SSB as an example, several SSBs distributed in time domain, where an interval between a first SSB and a second SSB in time domain is t1, while the interval between the second SSB and a third SSB in time domain is t2, and the interval between the third SSB and a fourth SSB in time domain is t1, while the interval between the fourth SSB and a fifth SSB in time domain is t2, and so on. Assuming that the execution time duration of CCA is 3, where t1<t3<t2, the first SSB and the second SSB are distributed into the same SSB set, the third SSB and the fourth SSB are distributed into the same SSB set, and the fifth SSB and a sixth SSB are distributed into the same SSB set, and so on.

By distributing two adjacent signal blocks between which a time interval in time domain is less than the execution time duration of the CCA into the same signal block set, it is possible to realize that the signal block with sufficient time to execute the CCA is a first signal block in a set, and the signal blocks with insufficient time to execute CCA are distributed into the set.

In another possible implementation, at least two signal blocks belonging to a same time domain division in time domain are distributed into the same signal block set. In an embodiment, the time domain division is any one of the followings: one subframe, half subframe, one time slot, two or more time slots. This distribution method is relatively simple and intuitive.

Of course, in the embodiments of the present disclosure, other distribution methods are not limited. For example, two adjacent signal blocks, which belong to the same time domain division in time domain and the interval between which is less than the execution time duration of the CCA, may be distributed into the same signal block set.

After the signal block set is determined according to a certain distribution method, distribution states of n signal blocks included in the signal block set may include the following situations:

In one case, any two adjacent signal blocks of the n signal blocks included in the signal block set have no transmission time interval in time domain. That is, n adjacent signal blocks having no interval therebetween are formed into one signal block set. Taking the signal block as the SSB as an example, in the case of 30 kHz subcarrier interval shown in FIG. 3A or 120 kHz subcarrier interval shown in FIG. 4, two adjacent SSBs can be formed into one SSB set; and in the case of 240 khz subcarrier interval shown in FIG. 4, four adjacent SSBs can be formed into one SSB set.

In another case, at least two adjacent signal blocks of the n signal blocks included in the signal block set have a transmission time interval in time domain therebetween. In an embodiment, the transmission time interval is less than or equal to m symbols, and m is a positive integer. That is, n adjacent signal blocks spaced within m symbols are formed into one signal block set. Values of the m may be set in conjunction with parameters such as the subcarrier interval and the execution time duration of the CCA, for example, the time duration corresponding to m symbols in time domain is close to the execution time duration of the CCA, which is not limited in the embodiments of the present disclosure. Taking the signal block as the SSB as an example, in the case of 15 kHz subcarrier interval shown in FIG. 2 or kHz subcarrier interval shown in FIG. 3B, two adjacent SSBs with an interval of 2 symbols can be formed into one SSB set; and in the case of 30 khz subcarrier interval shown in FIG. 3B, four adjacent SSBs with an interval of less than or equal to 4 symbols can also be formed into one SSB set.

It should be noted that in this case, it is not necessarily that there is a transmission time interval between every two adjacent signal blocks included in the signal block set, as long as there is a transmission time interval between at least one group of adjacent signal blocks. For example, in the case of the 30 kHz subcarrier interval shown in FIG. 3A, four adjacent SSBs with an interval of less than or equal to 4 symbols can be formed into one SSB set. In this case, there is no transmission time interval between the first SSB and the second SSB, and there is no transmission time interval between the third SSB and the fourth SSB, and there is a transmission time interval of 4 symbols between the second SSB and the third SSB.

In an embodiment, beam directions of the n signal blocks included in the signal block set are similar, that is, the beam directions of the n signal blocks belong to the same sector area. The beam directions of the signal block refer to directions of the beams used to transmit the signal block. A center angle corresponding to the sector area may be defined in advance, such as 60°, 90°, or 120°, etc., which is not limited in the embodiments of the present disclosure. In the method, it helps to improve success rate of signal block transmission.

Step 502: Execute one CCA on a channel of an unlicensed spectrum before transmitting the signal blocks included in the signal block set.

Before the access network device 10 uses the unlicensed spectrum to transmit the signal blocks included in the signal block set, the access network device 10 executes the CCA once on the channel of the unlicensed spectrum.

In the embodiment of the present disclosure, the access network device 10 executes CCA once before transmitting the first signal block that actually needs to be transmitted in the signal block set; while between transmitting any two adjacent signal blocks in the signal block set, that is, before transmitting the second to the last signal block in the signal block set, the CCA is not executed.

In an embodiment, the access network device 10 executes a directional CCA. In some embodiments, a direction of CCA is same as a beam direction of a signal block in the signal block set. In other embodiments, the direction of CCA is different from a beam direction of a signal block in the signal block set. Exemplarily, the direction of CCA is a direction corresponding to a collection of the beam directions of the n signal blocks included in the signal block set. For example, multiple narrow beams are combined into a wide beam, and the direction of CCA can be the direction corresponding to the wide beam.

Step 503: If the result of the CCA is that the channel of the unlicensed spectrum is available, use the channel of the unlicensed spectrum to transmit the signal blocks included in the signal block set.

In the embodiment of the present disclosure, the n signal blocks defined in the signal block set refer to candidate positions for the signal blocks. That is, for a candidate position of any signal block, the access network device 10 may determine whether to actually transmit a signal block at the candidate position according to actual needs.

Figure 6A:
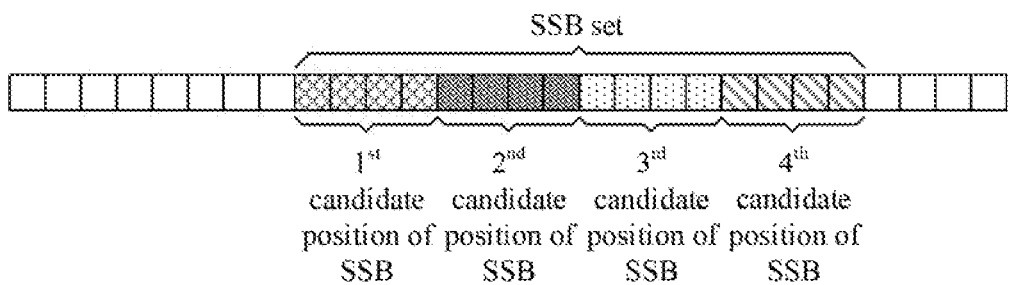
FIG. 6A is a schematic diagram exemplarily illustrating candidate positions of SSBs defined in a SSB set.
Figure 6B:
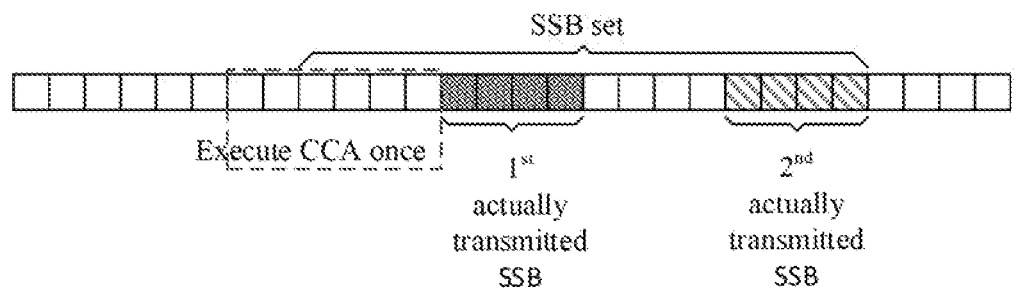
FIG. 6B is a schematic diagram exemplarily illustrating a distribution of actually transmitted SSBs.

For example, as shown in FIG. 6A, four SSB candidate positions are defined in the SSB set. For example, assuming that the access network device 10 decides according to actual needs, the SSB is not transmitted at a first and a third candidate positions of SSBs, and SSB is transmitted at a second and a fourth candidate positions of the SSBs, the schematic distribution diagram of actually transmitted SSBs is shown in FIG. 6B. For another example, assuming that the access network device 10 decides to transmit the SSBs at the first to fourth candidate positions of the SSBs according to actual needs, the schematic distribution diagram of actually transmitted SSBs is shown in FIG. 6C.

In an embodiment, before transmitting the first signal block in the set of the signal blocks that actually needs to be transmitted, the CCA is executed once, and when the execution of the CCA is completed and the result of the CCA is that the channel of the unlicensed spectrum is available, immediately transmit the first signal block that actually needs to be transmitted. That is, there is no time interval between the completion of the execution of the CCA and the first signal block in the signal block set that actually needs to be transmitted. This can avoid a situation that the SSB is not transmitted immediately when it is determined that the channel is available, and the channel is already occupied when the signal block is actually transmitted, so that it can improve the success rate of the signal block transmission and avoid signal interference.

Figure 6C:
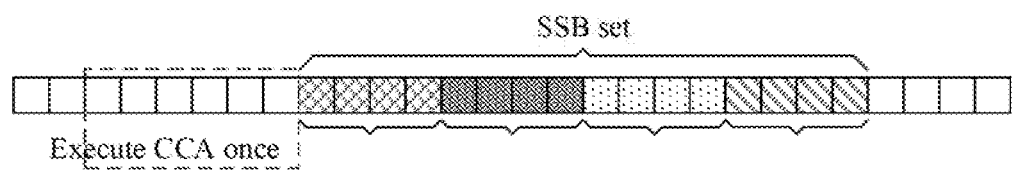
FIG. 6C is a schematic diagram exemplarily illustrating another distribution of actually transmitted SSBs.

For example, as shown in FIGS. 6B and 6C, before a first SSB actually needs to be transmitted, CCA is executed once, and then the first SSB which actually needs to be transmitted is immediately transmitted after the execution is completed.

In addition, the access network device 10 transmits the signal block to the terminal 20. When transmitting the signal blocks included in the signal block set, it may be transmitted by beam scanning, that is, different signal blocks may be transmitted by different beams; it may also be transmitted by non-beam scanning, for example, transmitting two or more signal blocks adopting the same beam, which is not limited in the embodiments of the present disclosure.

Figure 7:
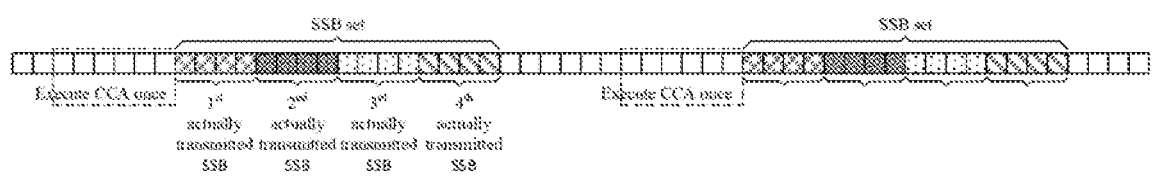
FIG. 7 is a schematic diagram exemplarily illustrating an execution of CCA when transmitting multiple SSB sets.

It should be noted that, before using the channels of the unlicensed spectrum to transmit signal blocks included in another signal block set, CCA is executed again on the channels of the unlicensed spectrum. That is, CCA needs to be executed once before transmitting any signal block set using channels of the unlicensed spectrum. For example, as shown in FIG. 7, before transmitting any SSB set using a channel of the unlicensed spectrum, CCA needs to be executed once.

In summary, the embodiments of the present disclosure provide a solution for using the unlicensed spectrum to transmit signal blocks in an NR system. The solution may be regarded as a compromise between two solutions, including performing only omnidirectional LBT and performing directional LBT before each signal block. The solution solves the problem of inability to meet the CCA detection time by the intervals among the signal blocks, makes it convenient for an access network device to make an appropriate directional LBT during signal block transmission, and improves the transmission success rate.

Taking the signal block as the SSB as an example, the solution provided by the embodiment of the present disclosure does not need to change the defined distribution design of SSB, and does not increase transmission delays of the SSB.

The following are embodiments of apparatus of the present disclosure. Details not described in the embodiments of apparatus may be referred to the embodiments of method.

Figure 8:
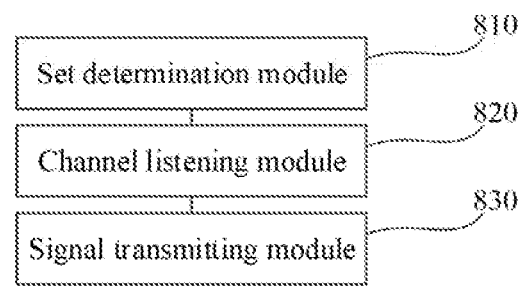
FIG. 8 is a block diagram of a clear channel listening apparatus provided by an embodiment of the present disclosure.

Please refer to FIG. 8, which illustrates a block diagram of an apparatus for clear channel listening provided by an embodiment of the present disclosure. The apparatus has a function to realize the method examples, and the function may be realized by hardware, or may be realized by hardware executing corresponding software. For example, the apparatus is the access network device 10. The apparatus may include: a set determination module 810, a channel listening module 820, and a signal transmission module 830.

The set determination module 810 is configured to determine a signal block set, where the signal block set includes n signal blocks, and each signal block includes at least one signal and/or at least one channel, and the n is an integer greater than 1.

The channel listening module 820 is configured to execute CCA once on a channel of an unlicensed spectrum before transmitting the signal block included in the signal block set.

The signal transmission module 830 is configured to use the channel of the unlicensed spectrum to transmit the signal blocks included in the signal block set if the result of the CCA is that the channel of the unlicensed spectrum is available.

In an embodiment provided based on the embodiment of FIG. 8, the signal block is SSB.

In another embodiment provided based on the embodiment of FIG. 8, each signal block includes: at least one signal and/or at least one channel associated with one SSB.

In another embodiment provided based on the embodiment of FIG. 8, each signal block includes: one SSB, and at least one signal and/or at least one channel associated with the one SSB.

In an embodiment, the at least one signal includes at least one of the following signals: a CSI-RS, a PTRS, and a DMRS.

In an embodiment, the at least one channel includes at least one of the following channels: a channel carrying RMSI, a PDCCH associated with RMSI, a channel carrying paging information, a PDCCH associated with paging information, a channel carrying OSI, and a PDCCH associated with OSI.

In an embodiment provided based on the embodiment of FIG. 8, the CCA is executed once before transmitting the first signal block in the signal block set that actually needs to be transmitted.

In another embodiment provided based on the embodiment of FIG. 8, the CCA is not executed between transmitting two adjacent signal blocks in the signal block set.

In another embodiment provided based on the embodiment of FIG. 8, the CCA is executed once again on the channel of the unlicensed spectrum before using the channel of the unlicensed spectrum to transmit a signal block included in another signal block set.

In another embodiment provided based on the embodiment of FIG. 8, the direction of the CCA is same as the beam direction of any signal block in the signal block set.

In another embodiment provided based on the embodiment of FIG. 8, a direction of CCA is different from a beam direction of each signal block in the signal block set.

In another embodiment provided based on the embodiment of FIG. 8, two adjacent signal blocks between which a time interval in time domain is less than the execution time of the CCA are distributed into the same signal block set.

In another embodiment provided based on the embodiment of FIG. 8, at least two signal blocks belonging to the same time domain division in time domain are distributed into the same signal block set.

In a possible design, the time domain division is any one of the following: one subframe, half subframe, one time slot, two or more time slots.

Figure 9:
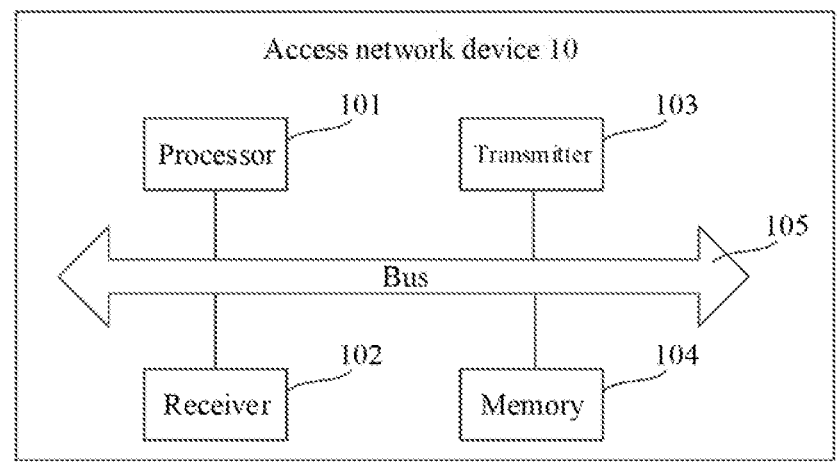
FIG. 9 is a schematic structural diagram of an access network device provided by an embodiment of the present disclosure.

Please refer to FIG. 9, which illustrates a structure schematic diagram of the access network device 10 provided by an embodiment of the present disclosure. The access network device 10 may include: a processor 101, a receiver 102, a transmitter 103, a memory 104, and a bus 105.

The processor 101 includes one or more processing cores, the processor 101 executing various functional applications and information processing by running software programs and modules.

The receiver 102 and the transmitter 103 may be implemented as one communication component, and the communication component may be a communication chip.

The memory 104 is connected to the processor 101 via the bus 105.

The memory 104 may be configured to store at least one instruction, and the processor 101 is configured to execute the at least one instruction to implement each step executed by the access network device 10 in the method embodiment.

In addition, the memory 104 may be implemented by any type of volatile or non-volatile storage device or a combination thereof. The volatile or non-volatile storage device includes but is not limited to: a magnetic disk or an optical disk, an electrically Erasable Programmable read-only memory (EEPROM), an erasable programmable read-only memory (EPROM), a static Random-access memory (SRAM), a read-only memory (ROM), a magnetic memory, a flash memory, a programmable read-only memory (PROM).

An embodiment of the present disclosure also provides a computer-readable storage medium, where at least one instruction is stored in the storage medium, and the at least one instruction is loaded and executed by a processor to implement the method for transmitting synchronizing signals on an unlicensed spectrum provided by the embodiment.

The present disclosure also provides a computer program product, when the computer program product runs on a computer, causes the computer to execute the method for transmitting synchronization signals on the unlicensed spectrum provided by the method embodiment.

Persons skilled in the art should be aware that in one or more of the examples, the functions described in the embodiments of the present disclosure may be implemented by hardware, software, firmware, or any combination thereof. When implemented by software, these functions can be stored in a computer-readable medium or transmitted as one or more instructions or codes on a computer-readable medium. The computer-readable media includes computer storage media and communication media, where the communication media includes any medium that facilitates transfer of a computer program from one place to another. The storage medium may be any available medium that can be accessed by a general-purpose or special-purpose computer.

The above is only exemplary embodiments of the present disclosure, which are not intended to limit the present disclosure. Any modification, equivalent replacement, improvement, etc. made within the spirit and principles of the present disclosure should be included in the protection scope of the present disclosure.

What is claimed is:

1. A clear channel listening method, wherein the method comprises:
    determining a signal block set, the signal block set comprising n signal blocks, each signal block comprising at least one signal and/or at least one channel, n being an integer greater than 1;
    executing one directional clear channel assessment (CCA) on a channel of an unlicensed spectrum before transmitting the signal blocks comprised in the signal block set, wherein a direction of the CCA comprises a direction corresponding to a collection of beam directions of the n signal blocks comprised in the signal block set; and
    when the result of the CCA is that the channel of the unlicensed spectrum is available, using the channel of the unlicensed spectrum to transmit the signal blocks comprised in the signal block set;
    wherein at least two signal blocks belonging to the same time domain division in time domain are distributed into the same signal block set.

2. The method according to claim 1, wherein the signal block is a synchronization signal block (SSB).

3. The method according to claim 1, wherein each signal block comprises: at least one signal and/or at least one channel associated with one SSB.

4. The method according to claim 1, wherein each signal block comprises: one SSB, and at least one signal and/or at least one channel associated with the one SSB.

5. The method according to claim 3, wherein the at least one signal comprises at least one of the following signals:
    a channel state information reference signal (CSI-RS),
    a phase tracking reference signal (PTRS),
    a demodulation reference signal (DMRS).

6. The method according to claim 3, wherein the at least one channel comprises at least one of the following channels:
    a channel carrying remaining minimum system information (RMSI),
    a physical downlink control channel (PDCCH) associated with RMSI,
    a channel carrying paging information,
    a PDCCH associated with paging information,
    a channel carrying other system information (OSI), and
    a PDCCH associated with OSI.

7. The method according to claim 1, wherein the CCA is executed once before transmitting a first signal block in the signal block set that actually needs to be transmitted.

8. The method according to claim 1, wherein the CCA is not executed between transmitting two adjacent signal blocks in the signal block set.

9. The method according to claim 1, wherein the direction of the CCA is the same as a beam direction of a signal block in the signal block set.

10. The method according to claim 1, wherein two adjacent signal blocks between which a time interval in time domain is less than execution time duration of the CCA are distributed into the same signal block set.

11. A clear channel listening apparatus, wherein the apparatus comprises:
    a processor; and
    a memory, and the memory stores at least one instruction, and the at least one instruction is used to be executed by the processor to enable the processor to:
        determine a signal block set, where the signal block set includes n signal blocks, and each signal block includes at least one signal and/or at least one channel, the n is an integer greater than 1;
        execute one directional clear channel assessment (CCA) on a channel of an unlicensed spectrum before transmitting the signal blocks included in the signal block set, wherein a direction of the CCA comprises a direction corresponding to a collection of beam directions of the n signal blocks comprised in the signal block set; and
        use the channel of the unlicensed spectrum to transmit the signal blocks comprised in the signal block set when the result of the CCA is that the channel of the unlicensed spectrum is available;
    wherein at least two signal blocks belonging to the same time domain division in time domain are distributed into the same signal block set.

12. The apparatus according to claim 11, wherein the signal block is a synchronization signal block (SSB).

13. The apparatus according to claim 11, wherein each signal block comprises: at least one signal and/or at least one channel associated with one SSB.

14. The apparatus according to claim 11, wherein each signal block comprises: one SSB, and at least one signal and/or at least one channel associated with the one SSB.

15. The apparatus according to claim 13, wherein the at least one signal comprises at least one of the following signals:
    a channel state information reference signal (CSI-RS),
    a phase tracking reference signal (PTRS), and
    a demodulation reference signal (DMRS).

16. The apparatus according to claim 13, wherein the at least one channel comprises at least one of the following channels:
    a channel carrying the remaining minimum system information (RMSI),
    a physical downlink control channel (PDCCH) associated with RMSI,
    a channel carrying paging information,
    a PDCCH associated with paging information,
    a channel carrying other system information (OSI), and
    a PDCCH associated with OSI.

17. The apparatus according to claim 11, wherein the CCA is executed once before transmitting a first signal block in the signal block set that actually needs to be transmitted.

18. The apparatus according to claim 11, wherein the CCA is not executed between transmitting two adjacent signal blocks in the signal block set.

19. The apparatus according to claim 11, wherein the CCA is executed once again on the channel of the unlicensed spectrum before using the channel of the unlicensed spectrum to transmit a signal block comprised in another signal block set.

20. The apparatus according to claim 11, wherein the time domain division is any one of the following: one subframe, half subframe, one time slot, two or more time slots.

21. The apparatus according to claim 11, wherein a beam direction of a signal block is a direction of a beam used by the signal block.

22. The method according to claim 1, wherein the beam directions of the n signal blocks belong to a same sector area.

23. The method according to claim 1, wherein the beam directions of the n signal blocks comprise directions corresponding to multiple narrow beams, and the direction of the CCA comprises a direction corresponding to a wide beam.

* * * * *